United States Patent
Perhats, Sr.

(10) Patent No.: US 8,525,368 B2
(45) Date of Patent: Sep. 3, 2013

(54) METHOD FOR POWERING AND TERMINATING OPERATION OF VEHICLE ACCESSORIES WITH ENGINE OFF

(76) Inventor: Frank J Perhats, Sr., Lake Barrington, IL (US)

(*) Notice: Subject to any disclaimer, the term of this patent is extended or adjusted under 35 U.S.C. 154(b) by 372 days.

(21) Appl. No.: 12/769,944

(22) Filed: Apr. 29, 2010

(65) Prior Publication Data
US 2010/0276994 A1 Nov. 4, 2010

Related U.S. Application Data

(60) Provisional application No. 61/174,057, filed on Apr. 30, 2009.

(51) Int. Cl.
*B60R 22/00* (2006.01)
(52) U.S. Cl.
USPC .......................................................... 307/10.6
(58) Field of Classification Search
USPC ........................................ 307/9.1, 10.1, 10.6
See application file for complete search history.

(56) References Cited

U.S. PATENT DOCUMENTS

| | | | | |
|---|---|---|---|---|
| 4,180,796 A | * | 12/1979 | Palafox | 180/287 |
| 4,412,137 A | * | 10/1983 | Hansen et al. | 307/10.6 |
| 5,149,799 A | * | 9/1992 | Rubens | 536/102 |
| 5,523,630 A | * | 6/1996 | Smelley et al. | 307/10.8 |
| 6,116,513 A | | 9/2000 | Perhats, Sr. | |
| 6,848,915 B1 | | 2/2005 | Perhats, Sr. | |
| 6,926,207 B2 | | 8/2005 | Perhats, Sr. | |
| 2003/0030325 A1 | * | 2/2003 | Shinada et al. | 307/10.1 |
| 2003/0042873 A1 | * | 3/2003 | Osada et al. | 320/166 |
| 2004/0262995 A1 | * | 12/2004 | Hawkins | 307/10.6 |
| 2005/0051638 A1 | * | 3/2005 | Perhats, Sr. | 237/12.3 B |
| 2005/0285559 A1 | * | 12/2005 | Siddiqui et al. | 320/103 |
| 2007/0049069 A1 | | 3/2007 | Perhats, Sr. | |
| 2009/0014220 A1 | * | 1/2009 | Ishizeki | 180/54.1 |

* cited by examiner

*Primary Examiner* — Daniel Cavallari
(74) *Attorney, Agent, or Firm* — Cook Alex Ltd.

(57) ABSTRACT

The intent of this invention is to minimize the possibility of exhausting the vehicle battery while still permitting operation of specific accessories with the engine off. The invention proposes to accomplish this by powering and terminating the operation of an accessory through and under the control of any type of no idle HVAC system or as a free standing auxiliary, accessory powering system having its own means of termination.

14 Claims, 1 Drawing Sheet

METHOD FOR POWERING AND TERMINATING OPERATION OF VEHICLE ACCESSORIES WITH ENGINE OFF

CROSS-REFERENCE TO RELATED APPLICATION

This application claims the benefit of U.S. Application Ser. No. 61/174,057, filed Apr. 30, 2009, the disclosure of which is incorporated herein by reference.

BACKGROUND

The present invention relates to powering vehicle accessories or auxiliary systems when the vehicle's engine is off. More specifically, it relates to powering and terminating operation of such accessories simultaneously with the powering and terminating operation of no engine idle interior heating or cooling systems, whether of the fuel fired or energy recovery type for cold weather use, or no idle air conditioning or ventilating systems operating from auxiliary batteries.

Operating commercial vehicle fleets frequently requires the presence of the operator within the vehicle cab for rest, meal and paper work stops or while the vehicle is waiting to load or unload. With the driver present, it becomes desirable to provide the means for operating accessories such as AM/FM radios, communication radios, lighting, or other accessories that normally function when the ignition is on and the engine is running but not when the ignition is off.

The intent of this invention is to minimize the possibility of exhausting the vehicle battery while still permitting operation of specific accessories with the engine off. The invention proposes to accomplish this by powering and terminating the operation of an accessory through and under the control of any type of no idle HVAC system or as a free standing auxiliary, accessory powering system having its own means of termination.

Although accessories can be wired to operate with the engine off, the process introduces the significant danger or inconvenience of the accessory being left indefinitely on by accident, exhausting the limited power available from a vehicle's storage battery, and putting at risk the ability to restart the vehicle's engine. Some accessories may be operated in some make or model vehicles by turning the ignition key to the accessory position. However, as with many types of no idle HVAC systems, turning the key to the ignition or accessory on position is interpreted as ignition on, thus interfering with proper operation of the HVAC system.

Other aspects, objects and advantages of the present invention, including the various features used in various combinations, will be understood from the following description according to illustrative embodiments of the present invention, taken in conjunction with the drawings in which certain specific features are shown.

SUMMARY

The intent of this invention is to minimize the possibility of exhausting the vehicle battery while still permitting operation of specific accessories with the engine off. The invention proposes to accomplish this by powering and terminating the operation of an accessory through and under the control of any type of no idle HVAC system or as a free standing auxiliary, accessory powering system having its own means of termination.

The termination means for either would be based on specific occurrences such as opening of a cab door or a combination of prioritized and sequenced criteria, like low battery voltage, timed operation or any other appropriate terminating signal obtained from the vehicle, integrated into the HVAC system, or programmable by the installer or even the user at time of initiation.

With either the independent or HVAC integrated versions, operation is as follows. During engine operation, the accessory is powered through the ignition system and may be turned on or off by the driver using the accessory's on/off switch. When the engine [ignition] is off and the auxiliary HVAC system is turned on, the accessory is powered in parallel through and under the control of the no idle HVAC system and the accessory may once again be turned on or off by the vehicle operator.

When an auxiliary HVAC system, of the energy recovery type, for example, terminates operation because engine coolant temperature has dropped below a certain temperature or because of low battery voltage, the accessory ceases operation as well.

In the case of the independent version of this invention, which is not part of an HVAC system containing a terminating system, the independent system would be equipped with its own terminating devices that may or may not be based on criteria similar to those used in the auxiliary HVAC system.

In the case of fuel fired no idle heating systems however, operation of the system may extend beyond the limited capacity of the electrical system to maintain operation of the accessory. Thus, termination of auxiliary or accessory systems associated with such systems must be based on battery voltage, timed operation, opening of the cab door or some combination thereof or another criteria rather than termination of the fuel fired HVAC system operation, which may normally be cycling on or off based on a vehicle interior temperature sensor.

DESCRIPTION OF THE ILLUSTRATED EMBODIMENTS

Although the present invention is described as illustrated in the attached drawings of two possible embodiments, it is to be understood that the illustrated embodiments are merely exemplary of the invention, which may be embodied in various forms. Therefore, specific details disclosed herein are not to be interpreted as limiting, but as a representative basis for teaching one skilled in the art to variously employ the present invention in virtually any appropriate manner.

Figure 1:
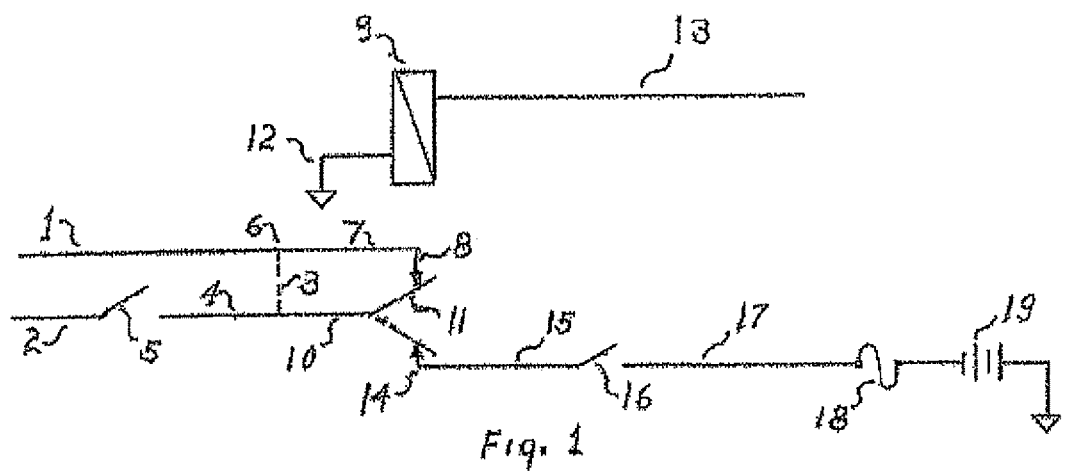
FIG. 1 illustrates the circuit of an independent accessory powering system having no termination means.

The left portion of FIG. 1 illustrates the basic power supply circuit of a typical vehicle accessory. A load at conductor 2 receives power as follows. When the ignition is on, battery plus [+] is supplied from conductor 1 via conductors 1, 3 and 4 to load on conductor 2 when accessory switch 5 is engaged. When ignition is turned off, power is removed at conductor 1; and though switch 5 is still engaged or on, the accessory at conductor 2 is now unpowered. Thus, it can be seen that most vehicle accessories are purposely wired to be unpowered when the ignition [engine] is off. The need for this is obvious; an accessory that was accidentally left on [switch 5 engaged] would remain powered with the ignition [engine] off and quickly exhaust the vehicle battery.

The balance of FIG. 1 illustrates the addition of an independent, auxiliary but parallel power supply system that can power a vehicle accessory with the ignition [engine] off. This auxiliary power supply control system is inserted into the existing accessory power supply by splicing it into the circuit in series as follows. Conductors 1, 3 and 4 are parted at 6. Conductor 1 is connected to normally open [NO] contact 8 of auxiliary power supply relay 9 via conductor 7. On the other side of the cut, conductor 4 is connected to conductor 10, which is connected to transfer contact 11 of relay 9. Relay 9 is grounded at 12 and receives battery plus [+] power via conductor 13 when the ignition is on and is unpowered when the ignition is off.

With the auxiliary power supply inserted into the vehicle accessory circuit, the accessory is powered thusly from its normal source when the ignition is on. Relay 9 is powered via conductor 13 connected to an ignition on battery plus source. With relay 9 powered, transfer contact 11 is engaged with contact 8, reconnecting accessory load at conductor 2 to its original power source at conductor 1 as follows. Power from supply at conductor 1 is transferred via conductor 7, contact 8 of relay 9 (now in engagement with transfer contact 11), to conductors 10 and 4, and closed switch 5 to load [accessory] at conductor 2, thus powering the accessory from its original source. When the ignition is turned off, relay 9 becomes unpowered because of loss of battery plus [+] on conductor 13, causing transfer contact 11 of relay 9 to disengage from fixed contact 8 and engage back contact 14. As can be seen, power to the accessory load at conductor 2 is now removed by both the loss of power at conductor 1 because the ignition was turned off and because of the opening of the relay contacts 8 and 11.

However, with the dormancy of relay 9, transfer contact 11 is now engaged with relay back contact 14, providing the opportunity for powering the accessory load at conductor 2 from a second source with the ignition off, as follows. Contact 14 is connected in series to conductor 15, switch 16, conductor 17 and fuse 18, to a constant on battery plus [+] source 19. When the optional auxiliary power supply switch 16 is closed, power is supplied to the vehicle accessory load at conductor 2 with the ignition off as follows; constant on battery 19 to fuse 18, conductor 17, closed switch 16, dormant relay back contact 14 (now in engagement with transfer contact 11), conductors 10 and 4, and closed switch 5 to accessory load at conductor 2, powering the accessory with the ignition off.

As can be seen, the accessory load at conductor 2 is now powered with the ignition off and will be so powered until it is disconnected manually by turning off either accessory switch 5 or auxiliary power supply switch 16. Failing to do either with the ignition off could cause the vehicle battery to become discharged. The addition of an automatic termination device would greatly diminish this likelihood.

Figure 2:
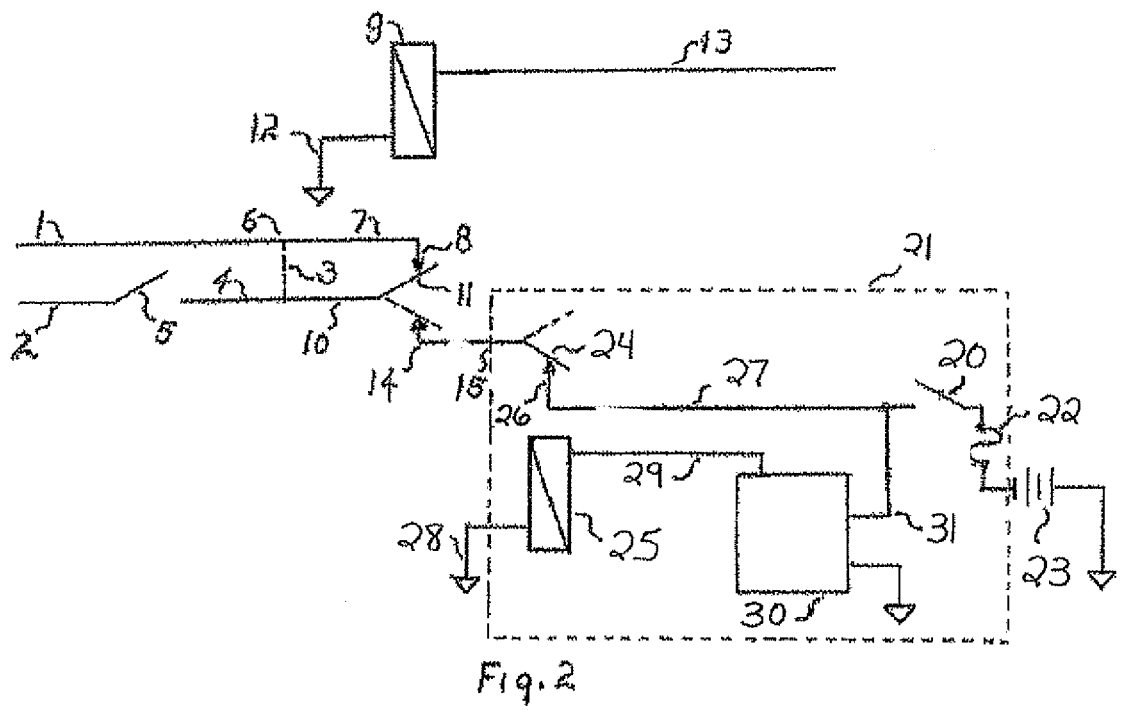
FIG. 2 illustrates the same independent circuit with the addition of automatic termination means that are independent or are part of any type of no idle HVAC system.

The addition of such a termination device to the circuit of FIG. 1 is shown in FIG. 2 and may be part of a stand-alone auxiliary accessory power supply system or as part of a no idle heating, ventilating, and air conditioning [HVAC] system, whether of the fuel burning type, energy recovery type, battery operated, compressor driven refrigeration type air conditioner or any other engine off system.

The components of FIG. 2 marked from 1 through 15 are identical in function to similarly numbered components of FIG. 1 as described above. Added are sensor 30 and relay 25 under its control, and associated conductors, switches and fuses, functions of which are later described herein.

Sensor 30 and relay 25 under its control, represent a termination device or sensor that is free standing or part of a no idle HVAC system represented by 21. As part of a free standing, ignition off auxiliary accessory power supply, its sole function is to terminate operation of the auxiliary accessory power supply. As part of any type of no idle HVAC system, its primary function is to terminate operation of the HVAC system, which then also terminates operation of the auxiliary power supply.

It is to be understood then, that sensor 30 and relay 25 under its control, represent any sensor system or systems that may individually or in series, freestanding or as part of a no idle system, sense conditions that require termination of function of the no idle system or the auxiliary accessory power system or both.

Sensor 30 can then be a battery voltage or battery charge sensor, a timing device, a temperature sensor or any other sensor individually or in series combinations which terminates operation of a no idle system, a freestanding auxiliary accessory power supply system or the combination of the two (e.g., system 21).

The added components of FIG. 2 function as follows. As previously stated, with the ignition on and engine running, relay 9 is energized by way of conductor 13 connected to an ignition on battery source. This reconnects the accessory load at conductor 2 to its original power source at conductor 1 by the engagement of relay transfer contact 11 with contact 8. When the ignition is turned off, relay 9 becomes dormant and contact 11 disengages from contact 8 and transfers to engagement with contact 14. The load at conductor 2 receives power with the ignition off via contact 11 (now in engagement with contact 14) as follows.

Contact 14 is connected by way of conductor 15 to the auxiliary accessory power supply termination system 21 which is, as previously mentioned above, an independent system or is part of the termination circuit of a no idle HVAC system. Switch 20 connects system 21 to constant on battery supply 23 via fuse 22. When switch 20 is closed, criteria appropriate to the nature of sensor 30 is evaluated by the sensor 30 and in turn either energizes associated relay 25 or leaves it dormant. For example, if sensor 30 is a battery voltage sensor and senses adequate voltage, relay 25 will be energized. Or, if sensor 30 is a timer, it will begin its timing cycle and energize relay 25. If sensor 30 is an engine coolant temperature sensor, as in energy recovery HVAC no idle systems, it also will power relay 25 upon sensing coolant temperatures to be adequate for system operation. For simplified future reference herein, this state for sensor 30 is referred to as the sensor activated state.

With sensor 30 in the activated state, the circuit operates as follows. Relay 25 (grounded at 28), receives power via conductor 29 from activated sensor 30, causing its transfer contact 24 to engage contact 26. Contact 26 is connected to battery 23 via conductor 27, switch 20, and fuse 22. When the vehicle engine is off, relay 9 is dormant and transfer contact 11 is engaged with back contact 14, receiving battery plus from battery 23 as previously described above and thus powering the accessory load at conductor 2, via closed accessory switch 5 and conductor 10.

As can be seen, power to the accessory load at conductor 2 can be interrupted by the occurrence of any one of the following four events: opening of the accessory switch 5; starting the engine, which powers relay 9, disengaging its contact 11 from contact 14; opening of the auxiliary accessory power supply switch 20 [or HVAC system switch 20] or by a termination signal from sensor 30 causing its associated relay 25 to disengage contacts 24 and 26.

It is to be understood then that a system to power accessories with the engine [ignition] off, can be a system that is an independent system, that may or may not be equipped with its own termination means or can be connected or made in such a manner as to be an integral part of any type of no idle HVAC system sharing the HVAC system's termination means.

It is to be assumed that the electro mechanical system described herein can functionally be produced by an electronic system, or combination electronic electromechanical or computerized vehicle electrical system as in multiplexed vehicles, and will be recognized by those skilled in the art as an equivalent to one or more elements of the following claims, and shall be covered by such claims to the fullest extent permitted by law.

It will be understood that the embodiments of the present invention which have been described are illustrative of some of the applications of the principles of the present invention. Numerous modifications may be made by those skilled in the art without departing from the true spirit and scope of the invention, including those combinations of features that are individually disclosed or claimed herein. For these reasons, the scope of the invention is not limited to the above description but is as set forth in the following claims.

The invention claimed is:

1. An electrical system for powering an accessory of a vehicle, comprising:
   a constant on battery source;
   an ignition on battery source that is available only when the vehicle ignition is on;
   a transfer switch electrically connected to the vehicle accessory;
   an auxiliary power circuit having an input and an output connected to one another, the input also being connected to the constant on battery source and the output being connected to the transfer switch, the auxiliary power circuit having a termination switch intermediate the input and output for interrupting the circuit therebetween and a sensor assembly connected to the input and controlling the termination switch;
   the transfer switch being alternately connectable to one of the ignition on battery source and the output of the auxiliary power circuit.

2. The electrical system of claim 1 wherein the termination switch is a relay.

3. The electrical system of claim 1 wherein the sensor assembly measures one of the voltage and battery charge of the constant on battery source.

4. The electrical system of claim 1 wherein the sensor assembly measures the time that has elapsed since deactivation of the ignition on battery source.

5. The electrical system of claim 1 wherein the sensor assembly measures the temperature of the coolant in the engine of the vehicle.

6. The electrical system of claim 1 wherein the vehicle accessory is a HVAC system.

7. The electrical system of claim 1 wherein the transfer switch comprises the contacts of a relay.

8. A method for powering a vehicle accessory in a vehicle having a battery, an ignition switch, a constant on battery source and an ignition on battery source, the method comprising the steps of:
   connecting the vehicle accessory to a transfer switch;
   connecting the transfer switch to the ignition on battery source when the ignition switch is on and disconnecting the transfer switch from the constant on battery source when the ignition switch is on;
   connecting the transfer switch to the constant on battery source when the ignition switch is off and disconnecting the transfer switch from the ignition on battery source when the ignition switch is off;
   measuring a condition via a sensor; and
   disconnecting the constant on battery source from the transfer switch based on the condition measured by the sensor.

9. The method of claim 8 wherein the sensor controls a relay and the relay performs the step of disconnecting the constant on battery source from the transfer switch.

10. The method of claim 8 wherein the condition measured by the sensor is the voltage of the constant on battery source.

11. The method of claim 8 wherein the condition measured by the sensor is the constant on battery source's remaining charge.

12. The method of claim 8 wherein the condition measured by the sensor is the time that has passed since the ignition switch was disconnected.

13. The method of claim 8 wherein the condition measured by the sensor is the temperature of engine coolant of the vehicle.

14. The method of claim 8 wherein the vehicle accessory is a HVAC system.

* * * * *